June 18, 1940.  A. E. SCHMIDT  2,204,914
MOWING IMPLEMENT
Original Filed April 24, 1936  4 Sheets-Sheet 1

Inventor
ALBERT E. SCHMIDT
By Vaul, Paul Moore
ATTORNEYS

June 18, 1940.　　　A. E. SCHMIDT　　　2,204,914
MOWING IMPLEMENT
Original Filed April 24, 1936　　4 Sheets-Sheet 3

Inventor
ALBERT E. SCHMIDT
By Paul, Paul Klloom
ATTORNEYS

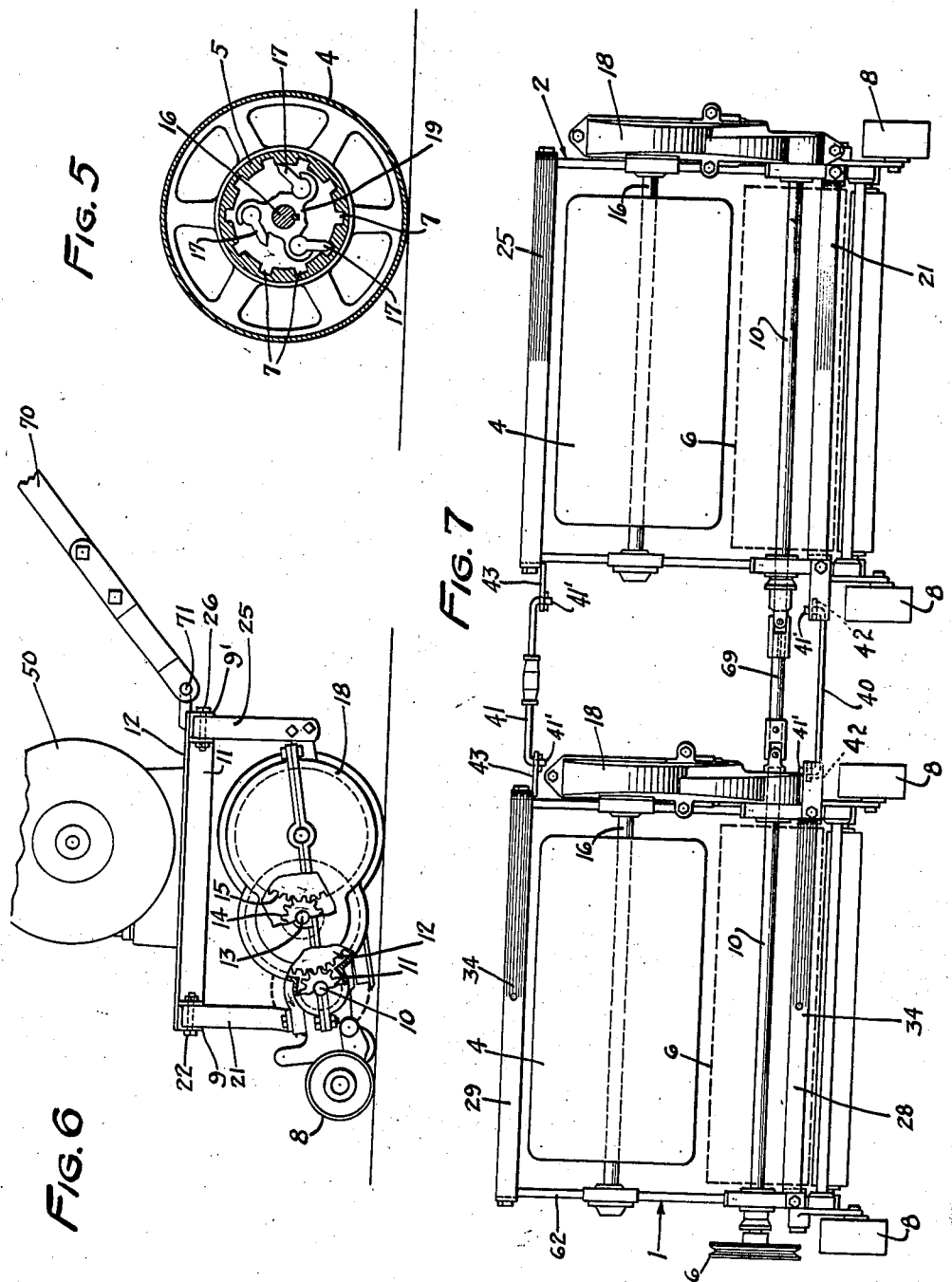

Patented June 18, 1940

2,204,914

UNITED STATES PATENT OFFICE 2,204,914

MOWING IMPLEMENT

Albert E. Schmidt, Omaha, Nebr., assignor to Toro Manufacturing Corporation of Minnesota, Minneapolis, Minn., a corporation of Minnesota Application April 24, 1936, Serial No. 76,210
Renewed March 3, 1938

15 Claims. (Cl. 56—7)

This invention relates to improvements in mowing implements and has as an important object to produce an implement adapted for use on the greens of golf courses, wherein it is desirable to have a machine which will efficiently operate without injury to the grass.

Various types of machines have been used for mowing greens and it has been the general practice to use more than two cutting units or mowers and to arrange the units to cut overlapping swaths. One of the objections to the use of such an implement is that it is more difficult to make turns at the ends of the cuts, without injury to the grass. The matter of turns has an important bearing on the character of the structure needed, because the accepted method is to mow by going back and forth in opposite directions giving a cut in which alternate swaths are cut in opposite directions throughout the whole width of the green. This necessitates turning of the machine through an angle of 180° at the end of each cut before starting back in the opposite direction. The present invention provides an implement which can be easily turned without injury to the green, and which has mowers that can conform to inequalities of the ground. None of the power machines heretofore employed, which have been arranged to cut overlapping swaths by the several units, has been able to produce as desirable a surface for putting greens as by hand mowing. This is because the hand mower is a single unit producing narrow swaths that are alternately cut in opposite directions. This invention permits narrow swaths to be cut alternately in opposite directions by means of a power gang mower. This greatly reduces the cost of mowing as compared to hand methods or single unit power machines.

A feature of the invention relates to the use of mowers which are substantial duplicates, but in which the wheels or drums are driven from or through or by means of the cutter shafts instead of driving the cutter from or by means of the drum, as is usual.

Another feature is to use only two mowers of this kind and to hold them in spaced relation transverse to the direction of travel by suitable spacing means to which they are attached for rocking movement substantially in a vertical plane which is transverse to the direction of travel.

Another feature of the invention relates to the method of driving the cutters, by coupling one cutter shaft with the other, and then driving one of the cutter shafts by a motor mounted on the spacing means.

Another feature of the invention relates to the use of a sliding rocking connection for one of the mowers and the connection of the mowers in a manner to obtain proper automatic adjustment conformably to ground contour, which adjustment includes a bodily lateral or sliding motion of one of the mowers in a direction transverse to the line of travel.

Features of the invention include: the driving of the ground wheels or drums from the cutter reels; the driving of the cutter reels in tandem or one through or by the other; the connection of at least one of the mowers with the spacing means to permit the mower to adjustably slide in a direction transverse to the line of travel; and all details of construction relating to the mounting of the units as well as the mounting and motion of the driving connections, along with all the broader ideas of means inherent in the disclosure and including combinations and sub-combinations of the parts.

Objects, features and advantages of the invention will be set forth in the description of the drawings, and in said drawings;

Figure 5 is a vertical section on line 5—5 of Figure 4 showing the action of the pivoted driving dogs on the drum;

Figure 6 is an end elevation looking from the right side of Figure 2 with parts broken away to show the driving gear train between the cutter shaft and the drum;

Figure 7 is a top plan view of the units with the spacing means or connecting frame removed, and showing the coupling or through-driving connection between the shafts of the cutter reels, and also showing the connections which pivotally connect the mowers and maintain them in a position square to the direction of travel;

Figure 8 is a detail vertical section on line 8—8 of Figure 2 illustrating the rocking connection of one of the mowers with the spacing means;

Figure 9 is a detail vertical section on line 9—9 of Figure 2 illustrating the rocking and sliding connection for the other mower with the spacing means;

Figure 10 is a detail vertical section on line 10—10 of Figure 1, illustrating the sliding and pivotal drive connection, permitting movements of the unit conformably to ground contour; and Figure 11 is a detail horizontal section on line 11—11 of Figure 2, further illustrating the drive connection of Figure 10.

Figure 1:
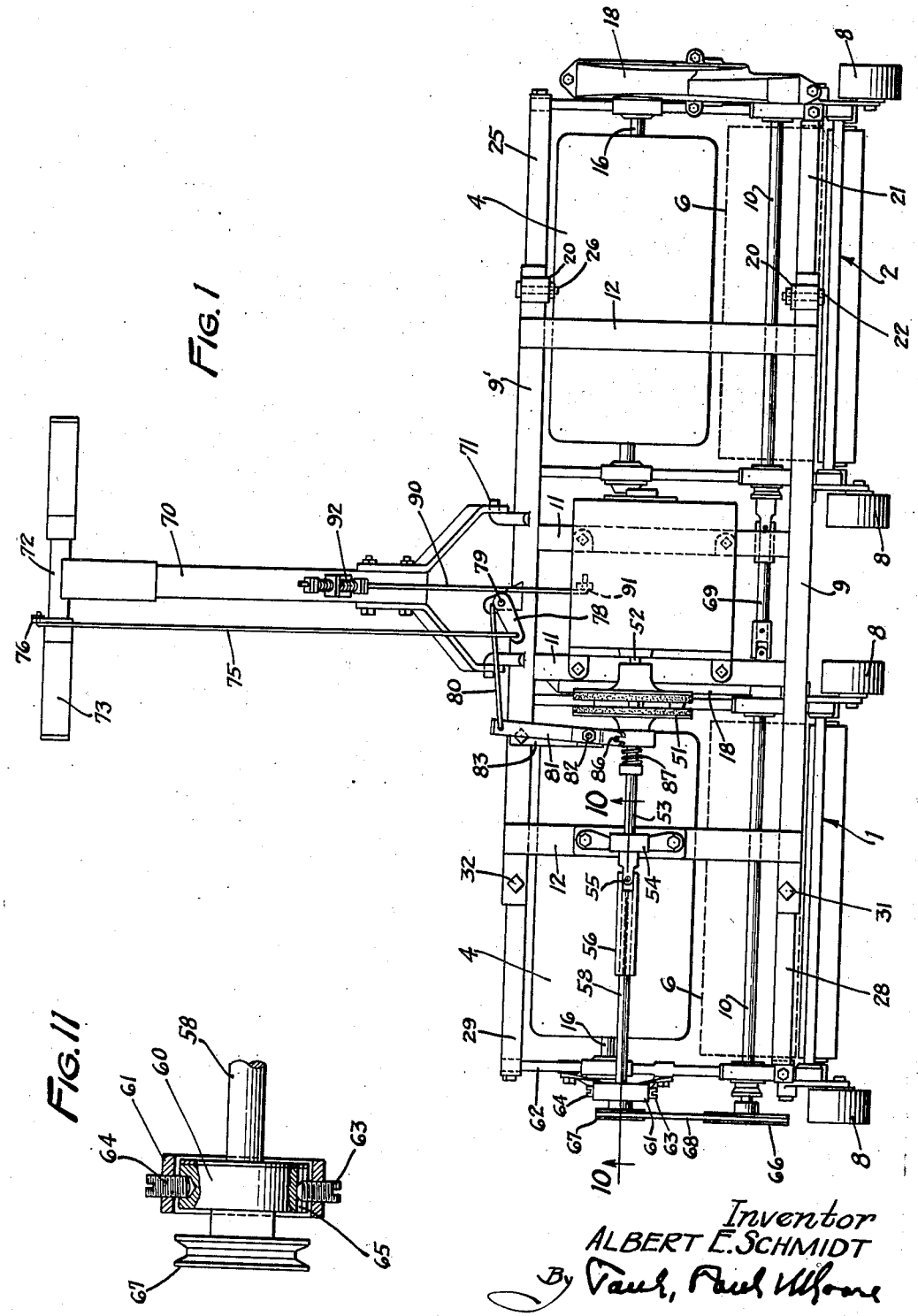
Figure 1 is a top plan view, with the cutter-controlling clutch open or out.
Figure 2:
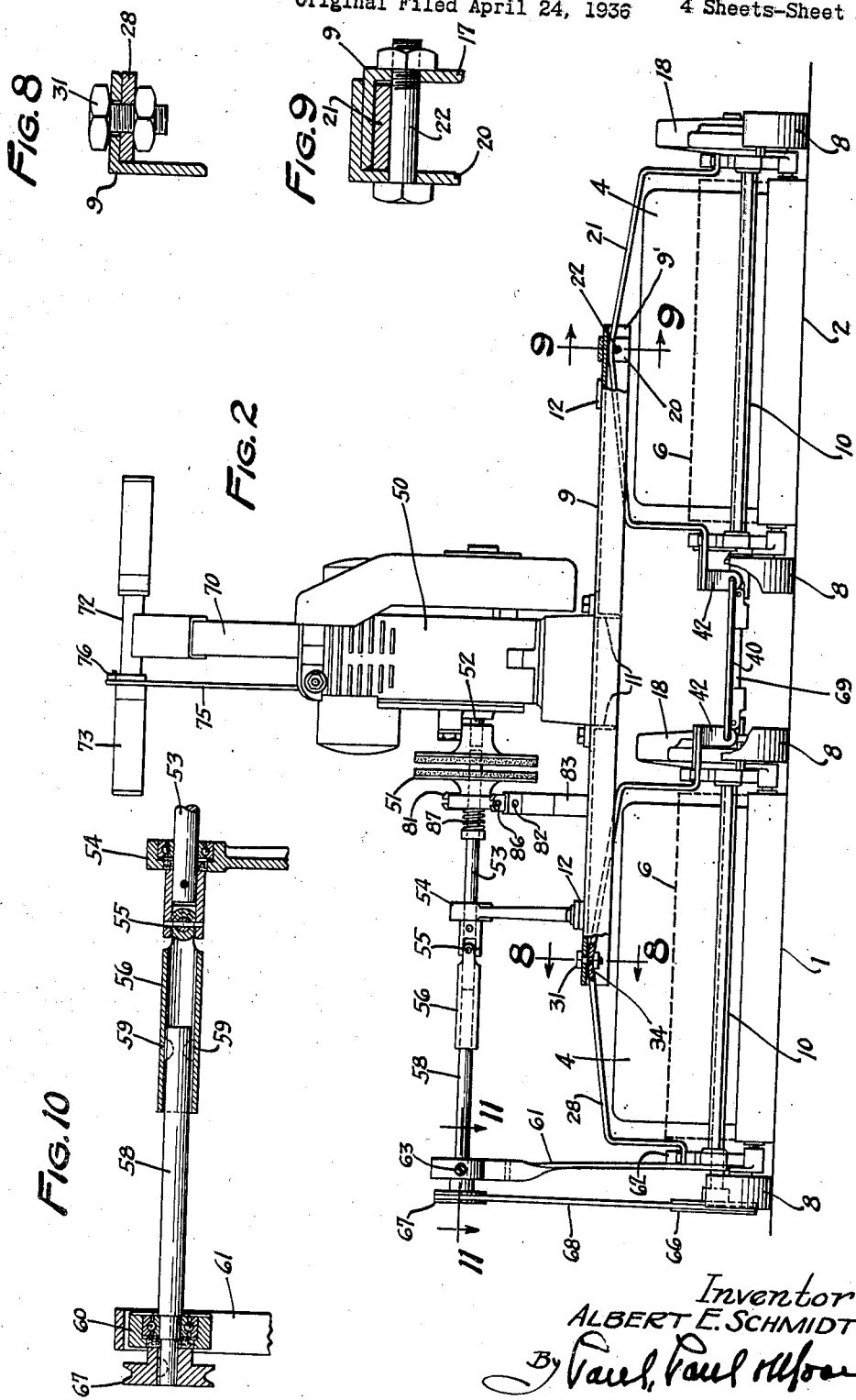
Figure 2 is a front elevation partly in section showing the pivotal rocking and sliding connections between the spacing means or frame and the front sides of the mower units.
Figure 3:
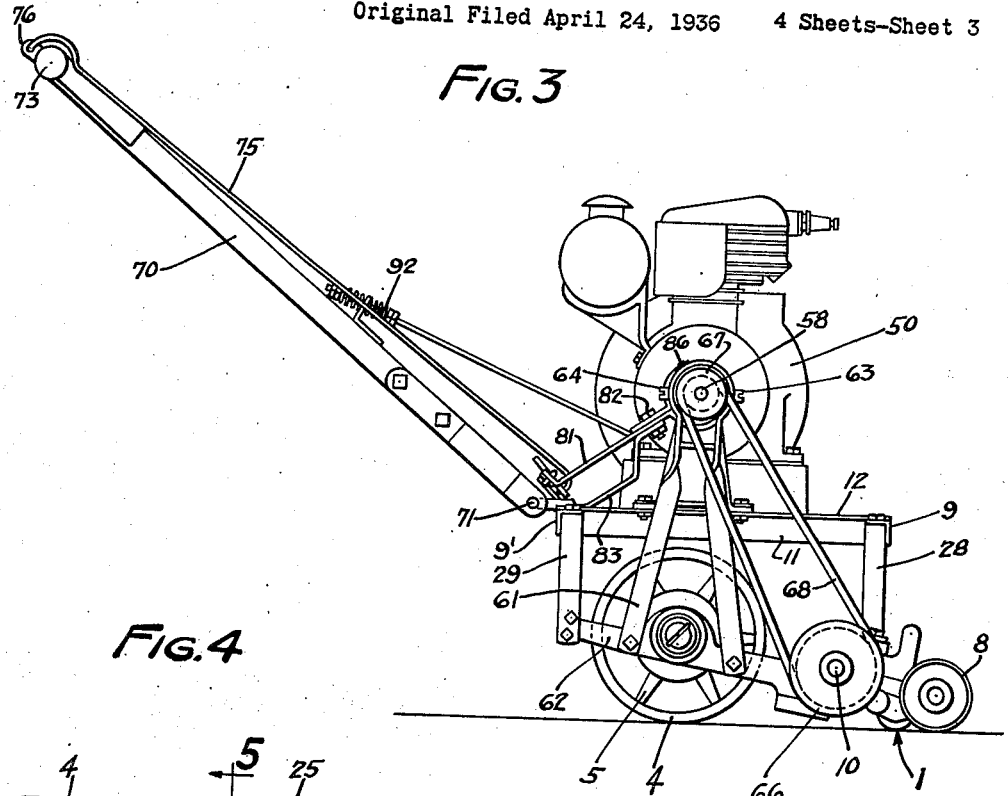
Figure 3 is an elevation looking from the left end of Figure 2.

Referring first to Figures 1 and 2: Numeral 1 generally designates the right-hand mower, numeral 2 the left-hand mower. The mowers are substantially identical in construction, and in each the driving mechanism differs from the driving mechanism of the ordinary mower in that the rolling support, drum or ground wheel is driven by or through the cutter, instead of driving the cutter. These mowers are referred to as units and each is provided with a rolling ground support 4, in this instance having the form of a drum, the object being to provide a type of rolling element which will not injure the turf. Each unit is also provided with a cutter indicated in dotted lines at 6. Each unit is, of course, provided with the usual means for regulating the depth or degree of the cut, this means including rollers 8 attached to the usual levers which are pivoted for adjustment and having means by which fine and accurate depth adjustment can be made.

Figure 4:
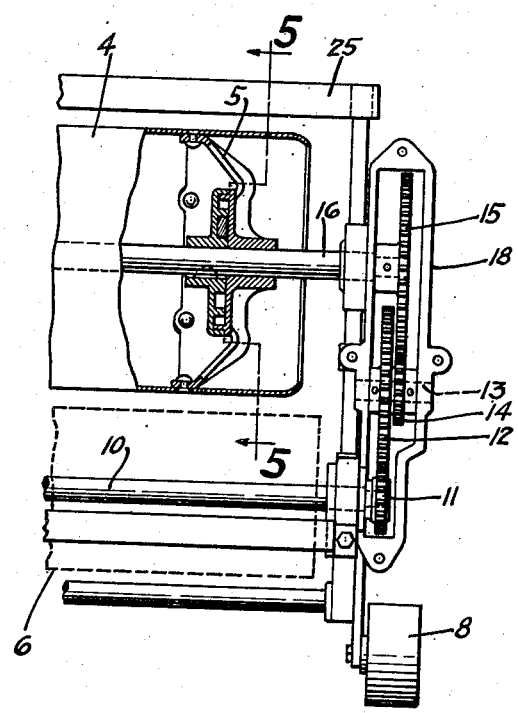
Figure 4 is a plan view partly in section illustrating how the drum or ground-rolling element is driven from the cutter shaft.

Referring to Figures 4, 5 and 6, and to the means by which the cutter drives the drum: The cutter shaft 10 has a gear 11 meshing with a gear 12 of shaft 13, said shaft having a pinion 14 meshing with a gear 15 of the drum shaft 16. The gearing is enclosed in a suitable casing 18. The drum 4, see Figure 5, has therein a spider structure generally indicated at 5 providing internal pockets or abutments 7, with which the freely pivoted dogs 17 are engageable as shown, the said dogs being suitably mounted on element 19 keyed to the drum shaft 16. The gearing arrangement and the dogs is such that when the cutters are driven in cutting direction and by means now to be described, the drum will also be driven to propel the unit in forward or cutting direction. The construction of each unit may be standard except in regard to the arrangement whereby the drum is driven from or through the cutter shaft. Since no standard part of the construction is claimed herein, no detailed description of such parts is given.

The units are spaced and aligned in a direction transverse to their travel, the cutter-to-drum driving gearing for each unit, in this instance being arranged at the left side. The spacing between the inner ends of the units may be varied. Spacing means for the units in this instance comprises a frame, see Figure 1, composed of front and rear elongated elements 9 and 9', connected by four cross elements symmetrically arranged at opposite sides of the longitudinal middle. Two of these elements are indicated at 11 and the two others are indicated at 12.

Each unit is connected to the spacing means, in this instance a frame, to permit independent movements of the units conformably to ground contours. Referring first to Figures 2 and 9: One of the units, in this instance the left-hand unit, is connected by its front and rear to the longitudinal elements 9 and 9' to allow sliding movement lengthwise of these elements or in a direction transverse to the line of travel, and to permit rocking in a vertical plane which is transverse to the line of travel. Slight play may be allowed for slight motion about a vertical axis but the arrangement is preferably such as to substantially prevent such rotative motion, and to hold the unit square to the line of travel.

In this instance, this connection for the left-hand unit comprises a bracket 20 attached near the end of the front bar 9 and a similar bracket 20 on the rear bar 9'. Each bracket has a downwardly extending portion which forms with the vertical flange 17 of the bar, a pocket or fork into and through which the arched element of the unit extends. The arched element at the front of the left-hand unit is designated 21. A bolt 22 passes horizontally through the depending portions of the bracket and flange and is so arranged as to permit the sliding and rocking movements referred to. The rear end of the left-hand mower has an arch bar 25 connected in a similar manner by a bolt 26 to bar 9'. The bolts 22 and 26 are aligned in direction of travel and it is noted that the bolts are applied at middle apical points of the arch bars 21 and 25.

Referring now to Figures 2 and 8: The right-hand mower has a front upwardly arched element 28 and a rear element of the same kind designated 29. These elements are connected by means of bolts 31—32, respectively to the front and rear longitudinal bars 9 and 9' of the frame or spacing means. The bolts pass through apical portions 34 of the elements 28 and 29 and the openings are of such size as to permit rocking movement in a vertical plane transverse to the direction of travel. Rotative movement in a horizontal plane about the axes of the bolts 31—32 is substantially prevented.

Referring to Figures 1, 2 and 7: It is noted that the inner ends of the units are cross-connected respectively at their forward and rear sides by means of rods, one of which is preferably provided with a turn buckle. The front connection is indicated at 40, the rear connection at 41. The bars have horizontal inturned ends 41' which pass through and swing in openings in bars or brackets 42 and 43 which are extensions respectively of the front arch bars 21 and 28 and of the rear arch bars 25 and 29. These connections provide means whereby rocking movements of the units in a vertical plane which is transverse to the direction of travel can occur. Also, by this means the right-hand unit can cause the left-hand unit to slide at its point of connection with the frame, when the right unit rocks sufficiently. These bars also assist in holding the units square to the direction of travel.

An important feature of this invention relates to the manner of driving the drum in propelling direction by or through the cutter reel. Another feature relates to the manner of driving the cutter reels one through the other, by a motor and connections between the motor and one cutter shaft. The drive connections permit of movements of the units conformably to ground contour.

Numeral 50 generally indicates an engine or motor of any preferred type capable of providing the proper amount of power. The motor is mounted on the cross arms 11. The drive shaft of the motor has a clutch indicated at 51. One of the clutch elements is keyed to the drive shaft 52 of the motor. The other clutch element is splined to a shaft 53 journaled in the companion clutch element and in a suitable bearing 54 arranged on cross bars 12. Now referring to Figure 10: Connected with the shaft 53 by means of a universal joint 55 is a sleeve 56 which slides on a shaft 58. The shaft 58 and the sleeve 56 are splined by means of keys 59, whereby a sliding driving connection is provided. The outer end of the shaft 58 is held in a bearing 60, the bearing being held by a bracket 61 mounted on a side frame member 62 of the right-hand mower. This bearing 60, see Figure 11, is capable of slight swinging movement in a horizontal plane conformably to motions of the right-hand unit. To this end the bearing is held at one side in its bracket by a trunnion 64 and is slotted at the opposite side as at 65, see Figure 11, to slidably receive the end of a set screw 63.

Referring to Figures 1 and 2: Attached to the outer end of the shaft 10 of the right-hand mower is a grooved wheel 66 and attached to the shaft 58 is a grooved wheel 67. A V-belt 68 operably connects the wheels. Other endless drive means can, of course, be used.

Referring now to Figure 7: It is noted that the inner end of the cutter shaft 10 of the right-hand unit is connected to the inner end of the cutter shaft 10 of the left-hand unit by means of a universal shaft connection generally indicated at 69. This connection allows movements of both units in a vertical plane which is transverse to the direction of travel, conformably to the ground contours. Both cutter shafts are, therefore, simultaneously driven from one end of one shaft, and inasmuch as each cutter shaft or cutter has a geared connection with its drum, the two drums are simultaneously driven.

The motor throttle is controlled by any suitable means, as is the clutch. In this case the control mechanism has been mounted on a steering bar indicated at 70 and pivoted as at 71 to the frame. This bar has a handle bar 72 having thereon at one end a rotatable sleeve 73. This sleeve is adapted to be grasped by the operator when controlling steering, and said sleeve controls the clutch in the following manner: A rod 75 connects at one end with an arm 76 of the sleeve and at the other end connects with one arm of a bellcrank lever 78 suitably pivoted as at 79 to a bracket of the frame member 9'. The opposite end of the bellcrank lever is connected by a rod 80 with a clutch-operating lever 81 pivotally mounted as at 82 on a suitable bracket 83. The outer end of the lever is forked and operatively engages with the pin 86 of one of the clutch elements. This clutch member is urged to clutch position by means of spring 87.

Throttle means for controlling the engine has not been shown but it will be understood that the control is mounted on the steering bar 70 adjacent the handle 72. The steering bar 70 is suitably supported in its operative position by a yieldable device including a rod 90 connected to the engine at one end as at 91 and at the opposite end by a yieldable spring system 92 which permits angular adjustment of the bar 70 with reference to the frame, about the pivot 71.

I claim as my invention:

1. A mowing implement comprising a pair of mower units each having a cutter and a rolling support which is driven by means of the cutter, a frame, means separately attaching each unit to the frame so that it can adjust itself conformably to ground contours, a motor on the frame, means by which one cutter drives the other, and means by which the motor drives one of the cutters.

2. A mowing implement comprising a pair of mower units displaced in direction transverse to their direction of travel, each unit having a cutter and a rolling support which is driven by means of the cutter, a frame, means separately attaching each unit to the frame so that it can adjust itself conformably to ground contours, connections by which one cutter drives the other, a motor on the frame and means by which the motor drives one of the cutters.

3. A mowing implement comprising first and second mower units aligned in a direction transverse to the direction of travel, each unit having a rolling support, a frame, means separately attaching each unit to the frame to rock in a vertical plane which is transverse to the direction of travel, the attaching means for the second unit permitting translation thereof in that transverse direction, means by which the first unit translates the second when the first rocks, a motor on the frame, and means by which the motor drives the rolling supports.

4. A mowing implement comprising first and second mower units aligned in a direction transverse to the direction of travel, each unit having a rolling support which is driven by means of the cutter, a fame, means separately attaching each unit to the frame to rock in a vertical plane which is transverse to the direction of travel, the attaching means for the second unit permitting translation thereof in that transverse direction, means by which the first unit translates the second when the first rocks, a motor on the frame, and means by which the motor drives the cutters.

5. A mowing implement comprising a pair of mower units aligned in a direction transverse to the direction of travel, each unit having a cutter and a rolling support which is driven by means of the cutter, a frame, means separately attaching each unit to the frame to rock substantially only in a vertical plane which is transverse to the direction of travel, one of said attaching means permitting translation of the unit in that transverse direction, means connecting the units to allow them to swing in said vertical plane, but to hold them square with the direction of travel, a motor on the frame, and means by which the motor drives the cutters.

6. A mowing implement comprising a pair of mower units aligned in direction transverse to their direction of travel, each unit having a cutter and a rolling support, a frame, means separately attaching each unit to the frame to rock in a vertical plane which is transverse to the direction of travel, one of said attaching means permitting translation of the unit in direction transverse to the direction of travel, means connecting the inner ends of the units to allow them to swing in a vertical plane but to hold them square with the direction of travel and to cause one unit to translate the other, a motor on the frame and means by which the motor drives the rolling supports through the cutters.

7. A mowing implement comprising a pair of mower units aligned in direction transverse to their direction of travel, each unit having a shaft and cutter thereon and a rolling support which is driven by the cutter, a frame, means separately attaching each unit to the frame to rock in a vertical plane transverse to the direction of travel, a motor on the frame and means by which the motor drives one cutter and means by which the shaft of one cutter drives the shaft of the other cutter.

8. A mowing implement comprising, a pair of mower units each having a cutter and ground wheels, means by which the cutter of each unit drives the wheels of that unit to advance the same, means by which the cutter of one unit drives the cutter of the other, power means for the implement, and means by which the power means drives one of the cutters.

9. A mowing implement comprising, a pair of mower units each having a cutter and ground wheels, each cutter including a shaft, means by which each cutter shaft drives the wheels of its unit to advance the mower, means by which the cutter shaft of one mower drives the cutter shaft of the other, power means for the implement and means by which the power means drives one of the cutter shafts.

10. A mowing implement comprising a pair of mower units aligned in direction transverse to their direction of travel, each unit having a cutter and a rolling support, a frame, means separately attaching each unit to the frame to rock in a vertical plane transverse to the direction of travel, a motor on the frame, means by which the motor drives one cutter, and a shaft connecting this driven cutter to drive the other cutter.

11. A mowing implement comprising a pair of mower units aligned in direction transverse to their direction of travel, each unit having a cutter and a rolling support, a frame, means separately attaching each unit to the frame to rock in a vertical plane transverse to the direction of travel, a motor on the frame, means by which the motor drives one cutter, and a shaft connecting this driven cutter to drive the other cutter, said shaft having a universal connection which allows swinging motions of both units in a vertical plane.

12. In a power lawn mower, a cutting unit including a power driven revoluble cutting reel and means for carrying said reel in suitable cutting relation to the ground, another cutting unit comprising a revoluble cutting reel and means for carrying said reel in suitable cutting relation to the ground, connection means between said units for maintaining the axes of said reels in substantially the same vertical plane transverse to the direction of travel, said connection means being formed to permit independent vertical movement of said units in conformance with the contour of the ground, and flexible shaft means connecting the power driven reel to the cutting reel of said other unit.

13. In a power gang lawn mower, a pair of laterally spaced mowing units each comprising a revoluble cutter and ground rolling element connected on parallel shafts, a frame and motor supported thereon carried by said spaced units, connection means between one of said units and the frame for maintaining said frame and unit in aligned traveling position said connection being formed to permit vertical oscillation of the frame relative to the unit, flexibly connected power transmitting means extending from the motor to one of said shafts on one of said units, a flexible driving connection from said shaft to the corresponding shaft of the other of said units, means including substantially parallel links interconnecting the units said means having pivotal joints disposed substantially in the horizontal plane of said flexible driving connection, for retaining the units in substantially parallel traveling direction.

14. In a power gang lawn mower, a pair of laterally spaced mowing units each comprising a revoluble cutter and ground rolling element connected on parallel shafts, a frame and motor supported thereon, connection means between one of said units and the frame for maintaining said frame and unit in aligned traveling position said connection being formed to permit vertical oscillation of the frame relative to the unit, flexibly connected power transmitting means extending from the motor to one of said shafts on one of said units, a flexible driving connection from said shaft to the corresponding shaft of the other of said units, substantially parallel link means interconnecting the units said link means having pivotal joints disposed substantially in the horizontal plane of said flexible driving connection for retaining the units in substantially parallel traveling direction, and limiting means formed to restrict horizontal swinging of said links.

15. In a power lawn mower, a cutting unit including a ground wheel, a revoluble cutting reel and means for carrying said reel in suitable cutting relation to the ground, another cutting unit comprising a ground wheel, a revoluble cutting reel, and means for carrying said reel in suitable cutting relation to the ground, and laterally spaced from the first mentioned unit, connection means between said units for maintaining the axes of said reels in substantially the same vertical plane transverse to the direction of travel, and power means for propelling the cutting units and the cutting reels thereof.

ALBERT E. SCHMIDT.